(12) United States Patent
Sato

(10) Patent No.: US 7,889,963 B2
(45) Date of Patent: Feb. 15, 2011

(54) OPTICAL WAVEGUIDE DEVICE AND DEVICE FOR PRODUCING OPTICAL WAVEGUIDE DEVICE

(75) Inventor: Koki Sato, Sagamihara (JP)

(73) Assignee: Mitsumi Electric Co., Ltd., Tama-Shi (JP)

( * ) Notice: Subject to any disclaimer, the term of this patent is extended or adjusted under 35 U.S.C. 154(b) by 0 days.

(21) Appl. No.: 12/087,529

(22) PCT Filed: Dec. 14, 2006

(86) PCT No.: PCT/JP2006/324937

§ 371 (c)(1),
(2), (4) Date: Jul. 9, 2008

(87) PCT Pub. No.: WO2007/080740

PCT Pub. Date: Jul. 19, 2007

(65) Prior Publication Data

US 2009/0003790 A1    Jan. 1, 2009

(30) Foreign Application Priority Data

Jan. 13, 2006    (JP) ............................... 2006-005944

(51) Int. Cl.
*G02B 6/00* (2006.01)

(52) U.S. Cl. ...................... 385/137; 385/14; 385/39; 385/49; 385/65; 385/136

(58) Field of Classification Search .................. 385/89, 385/49, 65, 39, 14, 136–137
See application file for complete search history.

(56) References Cited

U.S. PATENT DOCUMENTS

| | | | | | |
|---|---|---|---|---|---|
| 3,994,559 | A | * | 11/1976 | Crow et al. | 385/49 |
| 4,240,849 | A | * | 12/1980 | Kurokawa et al. | 156/73.2 |
| 4,930,854 | A | * | 6/1990 | Albares et al. | 385/49 |
| 5,574,811 | A | * | 11/1996 | Bricheno et al. | 385/52 |
| 6,295,404 | B1 | * | 9/2001 | Ichigi et al. | 385/137 |
| 6,324,323 | B1 | * | 11/2001 | Benham et al. | 385/49 |
| 6,808,322 | B2 | * | 10/2004 | Freund et al. | 385/92 |
| 7,174,062 | B2 | * | 2/2007 | Fukuyama et al. | 385/14 |
| 2005/0041907 | A1 | * | 2/2005 | Fukuyama et al. | 385/14 |
| 2005/0281513 | A1 | * | 12/2005 | Choi et al. | 385/89 |

FOREIGN PATENT DOCUMENTS

| | | |
|---|---|---|
| JP | 4-315109 A | 11/1992 |
| JP | 11-231163 A | 8/1999 |
| JP | 2004-020656 A | 1/2004 |

OTHER PUBLICATIONS

Japanese Office Action dated Sep. 28, 2010 (and English translation thereof) in counterpart Japanese Application No. 2007-553855.

* cited by examiner

*Primary Examiner*—Brian M. Healy
*Assistant Examiner*—Guy G Anderson
(74) *Attorney, Agent, or Firm*—Holtz, Holtz, Goodman & Chick, PC

(57) ABSTRACT

An optical waveguide device that is smaller in size and has higher impact resistance. The optical waveguide device (1) has a V-groove (14) formed in a groove forming surface (SF) at an end of a base board (10) where an optical waveguide section (11) is formed. An optical fiber element (22) is embedded by an adhesive layer (13) and connected to the base board (10) with an end of the optical fiber element (22) fitted in the V-groove (14).

6 Claims, 9 Drawing Sheets

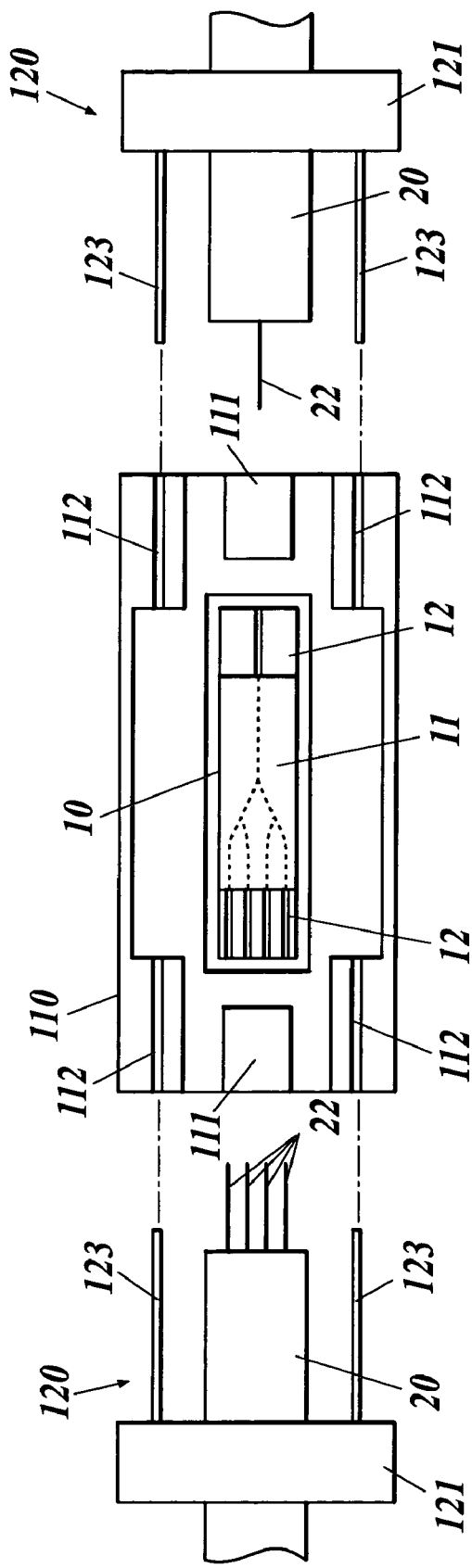

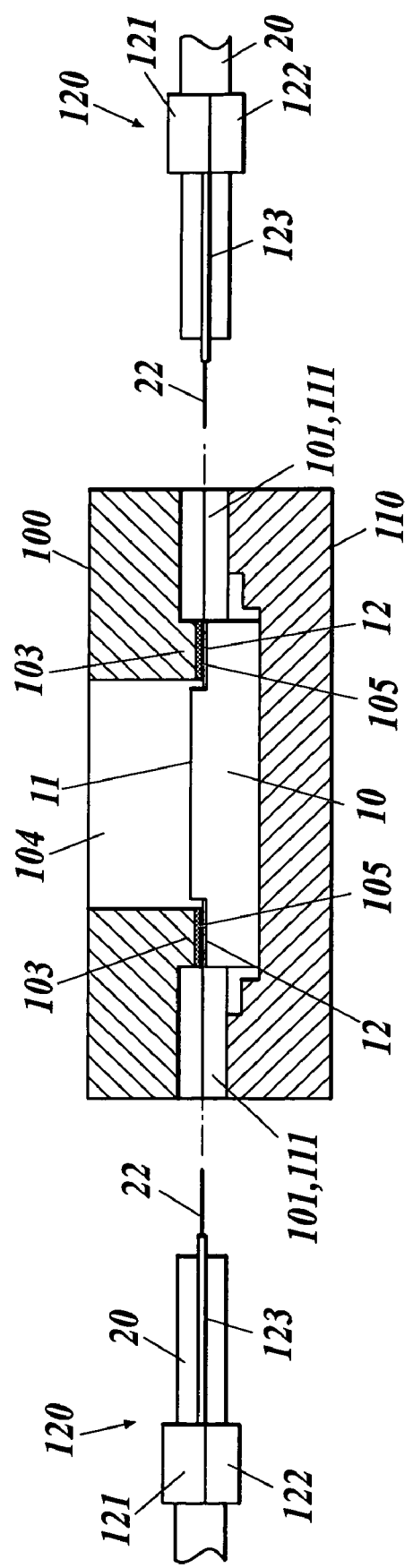

OPTICAL WAVEGUIDE DEVICE AND DEVICE FOR PRODUCING OPTICAL WAVEGUIDE DEVICE

This application is a U.S. National Phase Application under 35 USC 371 of International Application PCT/JP2006/324937 filed Dec. 14, 2006.

TECHNICAL FIELD

The present invention relates to an optical waveguide device connected to an optical cable and a device for producing an optical waveguide device.

BACKGROUND ART

In recent years, with the increase in speed of data communication, optical communication using optical cables is replacing communication using metallic cables and becoming the main stream. As an optical waveguide device which performs optical communication, for example, as shown in FIG. 8A, there is an optical waveguide device 200 optically connected to an optical cable 220 and the optical waveguide device 200 splits the light guided by the optical cable 220.

The optical cable 220 includes multiple or single optical fiber line 222 inside, and transmits light, which is guided by the optical fiber line 222, in an extending direction. The optical waveguide device 200 includes on a substrate 210 an optical waveguide section 211 and a connection section 212 for connecting the optical waveguide section 211 and the optical fiber line 222. The optical waveguide section 211 includes a core 2111 which is formed with a plurality of branches in a Y-shape and covered with cladding 2112, and the core 2111 splits and outputs the input light (or on the contrary, the core 2111 may assemble and output the input light).

As shown in FIGS. 8A and 8B, the connection section 212 is formed with V-grooves 215 which allows optical fiber lines 222 to fit on the substrate 210, and connects the optical guided wave between the optical fiber lines 222 and the core 2111 by fitting the optical fiber lines 222 exposed at the end of the optical cable 220 along walls of the V-grooves 215 for alignment (passive alignment) as well as pressing the optical fiber lines 222 with a glass block 213 and bonding and fixing the optical fiber lines 222 with an adhesive member 214 nipped with a pressing face of the glass block 213 and the walls of the V-grooves 215.

The patent document 1 shows a structure similar to the above-described structure where an optical fiber is inserted in a V-groove to perform alignment of an optical fiber end face and an optical waveguide such as an optical splitter and the optical fiber is pressed with a glass block from above to be bonded and fixed. Also, a technique to reduce core material which results when an optical waveguide is formed by a duplication method (or a stamper method) and interferes when an optical cable is bonded and fixed to a groove is disclosed.

As described above, as for a connection in optical communication between an optical cable and an optical device such as an optical splitter, Laser Diode (LD), Vertical-Cavity Surface-Emitting Laser (VCSEL), Photo Diode (PD), etc. or a connection between optical cables, it is important to perform accurate alignment in order to reduce loss in the connecting area and it is important to fix the connection so that the connection does not become misaligned even when a certain amount of external force is applied.

Patent Document 1: Japanese Patent Application Laid-Open Publication No. 2004-20656

DISCLOSURE OF THE INVENTION

Problems to be Solved by the Invention

However, in the above-described techniques, when impact is applied to the glass block pressing and fixing the optical fiber line after bonding, there is a problem that a break easily occurs because stress from the external impact is directly applied to the optical fiber line. Also, since the structure includes the glass block, it is difficult to reduce the size of the device. There is also a problem that the optical fiber line is broken by the glass block during production.

The present invention has been made in consideration of problems of the above-described techniques, and it is an object, to provide an optical waveguide device which is smaller in size and has higher impact resistance.

Means for Solving the Problem

In order to achieve the above object, according to a first aspect of the present invention, there is provided an optical waveguide device wherein:

a groove is formed on an end of a substrate on which an optical waveguide is formed, the groove formed along a light transmitting direction of the optical waveguide;

a connection end of an optical fiber is fitted into the groove; and the connection end of the optical fiber is embedded in an adhesive layer.

Preferably, a surface of the adhesive layer of the connection end of the optical fiber is a curved shape in accordance with a shape of an outer circumferential face of the optical fiber.

According to a second aspect of the present invention, there is provided a device for producing an optical waveguide device, comprising:

a lower jig to fix a substrate, the substrate including an optical waveguide formed thereon and a groove formed on an end of the substrate along a light transmitting direction of the optical waveguide; and an upper jig provided with an optical fiber control section, the optical fiber control section including a control face to be in contact with an upper face of a connection end of an optical fiber when the connection end of the optical fiber is fitted into the groove and the substrate is fixed to the lower jig.

Preferably, the control face of the optical fiber control section is coated with fluorine resin.

Preferably, the control face of the optical fiber control section includes a curved face in accordance with a shape of an outer circumferential face of the optical fiber.

Advantageous Effect of the Invention

According to the present invention, an optical waveguide device which is smaller in size and has higher impact resistance may be provided.

BRIEF DESCRIPTION OF THE DRAWINGS

FIG. 4A is an overhead view from a position of an upper jig 100 in a Z2 direction shown in FIG. 3;

FIG. 4B is an overhead view of a cross-section of the upper jig 100 and a lower jig 110 fitted and a side of a nesting member 120 in a X2 direction shown in FIG. 3;

BEST MODE FOR CARRYING OUT THE INVENTION

An embodiment of the present invention will be described in detail with reference to the drawings, however the present invention is not limited to the embodiment shown. This embodiment of the present invention shows a best mode of the present invention and terms and use of the present invention is not limited to the embodiment shown.

Optical Waveguide Device

Figure 1A:
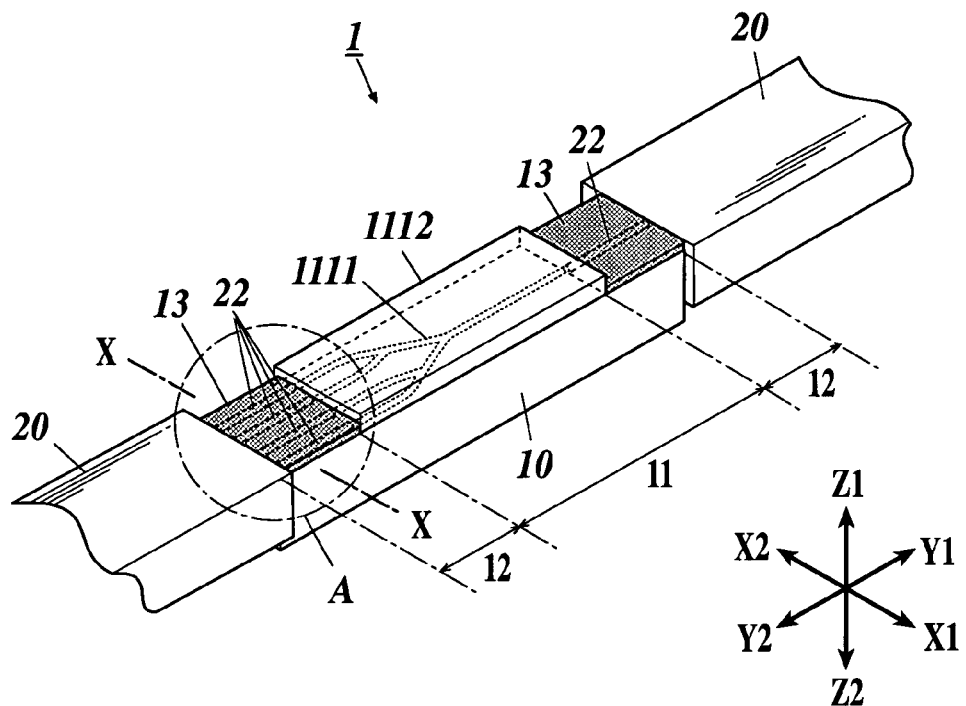
FIG. 1A is a perspective view showing an exterior of an optical waveguide device 1 of the present invention.
Figure 1B:
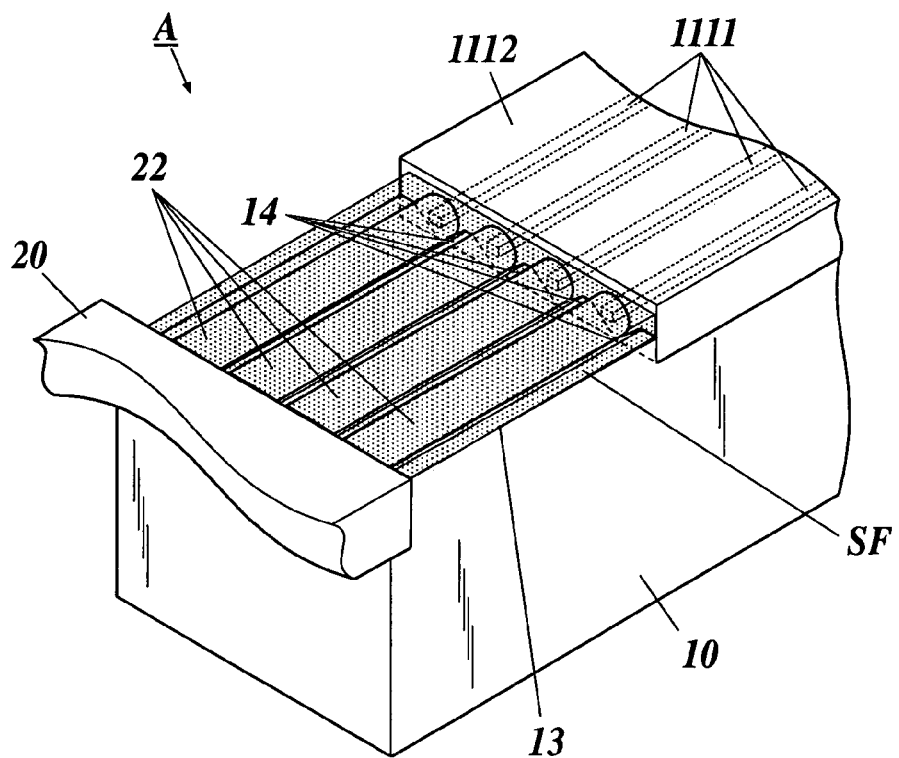
FIG. 1B is a perspective view enlarging an area A.
Figure 2A:
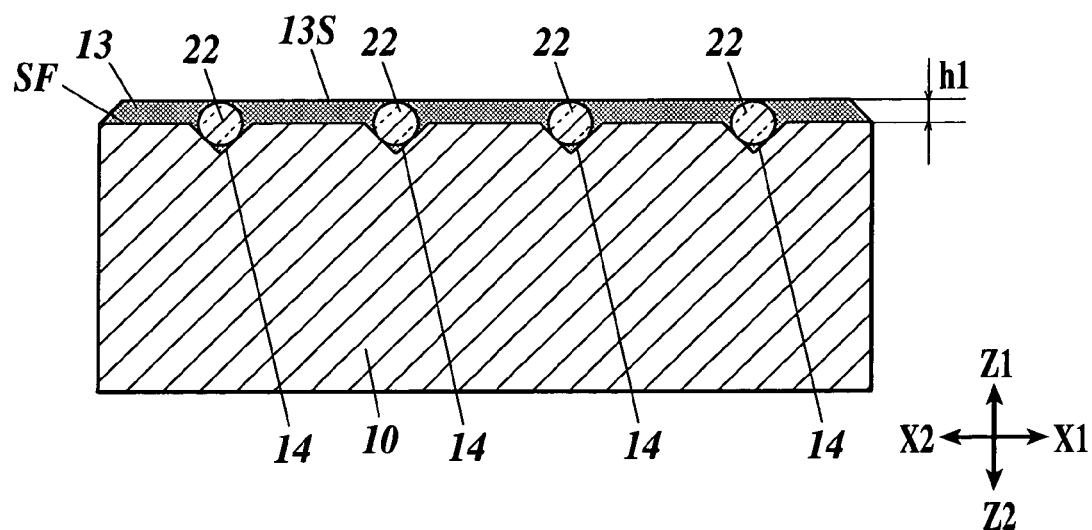
FIG. 2A is an end view showing an end face taken along X-X shown in FIG. 1A.
Figure 2B:
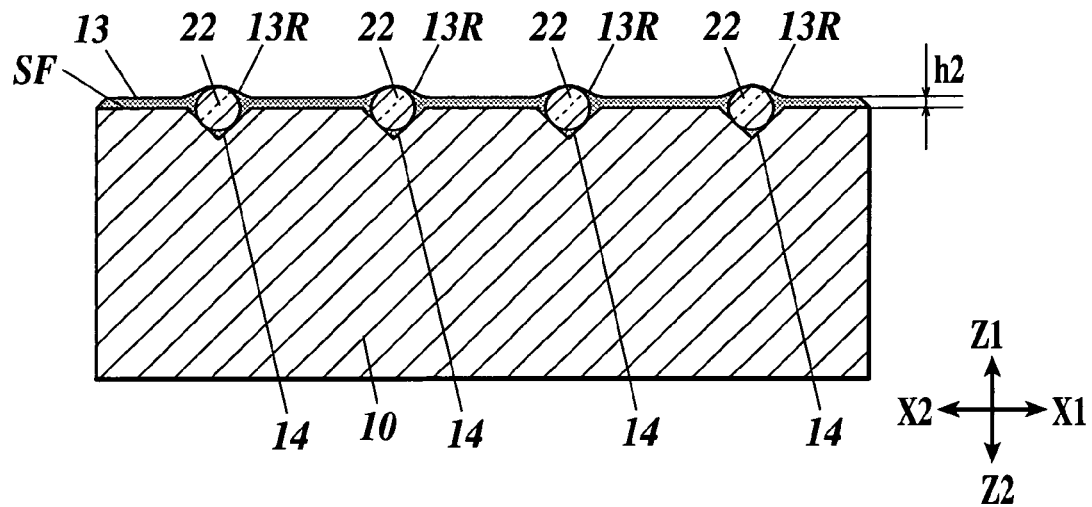
FIG. 2B is an end view showing an end face taken along X-X shown in FIG. 1A when a surface shape of an adhesive layer 13 is deformed.

First, an optical waveguide device will be described with reference to FIG. 1A, FIG. 1B and FIG. 2. FIG. 1A is a perspective view showing an exterior of an optical waveguide device 1 of the present invention, FIG. 1B is a perspective view enlarging an area A, FIG. 2A is an end view showing an end face taken along X-X shown in FIG. 1A, and FIG. 2B is an end view showing an end face taken along X-X shown in FIG. 1A when a surface shape of an adhesive layer 13 is deformed.

As shown in FIG. 1A, the optical waveguide device 1 includes an optical waveguide section 11 including a core 1111 which is covered with cladding 1112 and formed with a plurality of branches in a Y-shape on a face of a substrate in a Z1 direction of a substrate 10 for splitting the input light (or on the contrary, the light may be assembled) and an optical fiber connection section 12 for optically connecting the optical cable 20 to the optical waveguide section 11.

The optical cable 20 connected to the optical waveguide device 1 includes multiple or single optical fiber line(s) 222 inside and the optical fiber line(s) 222 is exposed from the end area to be connected to the optical fiber connection section 12. The optical fiber line 222 is formed by, for example, elongating a preform, which is silica (SiO2) glass doped with germania (GeO2) and the like, into a cylindrical shape, and at a center of the cylindrical shape the core is extended with being enwrapped by a cladding. The optical fiber line 222 may be a multicomponent glass or plastic optical fiber (POF) and the shape is not limited to a cylindrical shape as described above.

The optical cable 20 transmits light input to the core from one end of the optical fiber line 222 by total reflection and outputs the light to the other end.

As shown in FIG. 1B and FIG. 2A, as for the optical fiber connection section 12, V-grooves 14 which may fit optical fiber lines 22 are formed on a groove forming face SF on a substrate 10 in pre-designed positions according to a diameter of the optical fiber lines 22 or a position of the core 1111 in a direction along a light transmitting direction of the core 1111, and ends of the optical fiber lines 22 are fixed by being fitted into the V-grooves 14 and embedded in an adhesive layer 13.

The adhesive layer 13 is, for example, an ultraviolet curable adhesive which has optical transparency and a predetermined refractive index and Young's modulus in a state cured by ultraviolet irradiation. As shown in FIG. 2A, embedding the optical fiber line 22 in this adhesive layer 13 forms a surface 13S which is a plane almost parallel to the groove forming face SF and the thickness h1 is an amount which covers the outer circumference of the optical fiber lines 22. Although not shown, when embedded, the optical fiber lines 22 may be completely covered with a predetermined thickness from the outer circumference of the optical fiber lines 22 or a portion of an outer circumferential face of the optical fiber lines 22 may be exposed to the extent that the fixing of the optical fiber lines 22 by the adhesive layer 13 is not lost.

As shown in FIG. 2B, when the optical fiber lines 22 are embedded by the adhesive layer 13, a curve shaped surface 13R in accordance with the outer circumferential shape of the optical fiber lines 22 is formed near the optical fiber lines 22 and a thickness h2 may be thinner than the above-described thickness h1. As shown in the same figure, the surface 13R, according to the optical fiber lines 22, may be a face such that the cross-section of a coating by the adhesive layer 13 is an almost semicircular shape, or the surface may be a face whose cross-section is an inverted V-shape or a trapezoidal shape, and the shape is not limited.

The V-grooves 14 are formed along the light transmitting direction of the core 1111 in accordance with a size of the optical fiber lines 22 to be connected and a position of the core 1111 with an accuracy that connection loss does not occur when the optical fiber lines 22 and the core 1111 are optically connected, and are formed by anisotropic etching with a mask pattern formed by dicing or photolithography on the groove forming face SF of the substrate 10. The cross-section of the V-grooves 14 is V-shaped, and when the ends of the optical fiber lines 22 are fitted in, the optical fiber lines 22 are held in a position so that their outer circumferential surface are in contact with the face forming the V-shape. The shape of the cross-section of the V-grooves 14 is not limited and may be a U-shape or any other shape which may easily fit the optical fiber lines 22 and which enable accurate alignment with the face forming the shape.

As described above, in the optical waveguide device 1, the V-grooves 14 are formed on the groove forming face SF at the edge of the substrate 10 on which the optical waveguide section 11 is formed and the ends of the optical fiber lines 22 are fitted in the V-grooves 14 and embedded in the adhesive layer 13 to be connected to the substrate 10. Consequently, since there is no factor which applies excess stress to the optical fiber lines 22, impact resistance can be enhanced and as for the groove forming face SF, since the thickness is only that of the adhesive layer and a thickness of a glass block, etc. is not necessary, the size may be smaller.

Also, by forming the surface of the adhesive layer 13 in a curved shape in accordance with the outer circumferential shape of the optical fiber lines 22, the stress may be dispersed and the adhesive layer may be thinner, and thus the size may be smaller.

Device for Producing Optical Device

Next, a device for producing the above-described optical waveguide device 1 by inserting the optical fiber lines 22 of the optical cable 20 in the V-grooves 14 and fixing the optical fiber lines 22 in the adhesive layer 13 will be described with reference to FIG. 3 to FIG. 7B.

Figure 3:
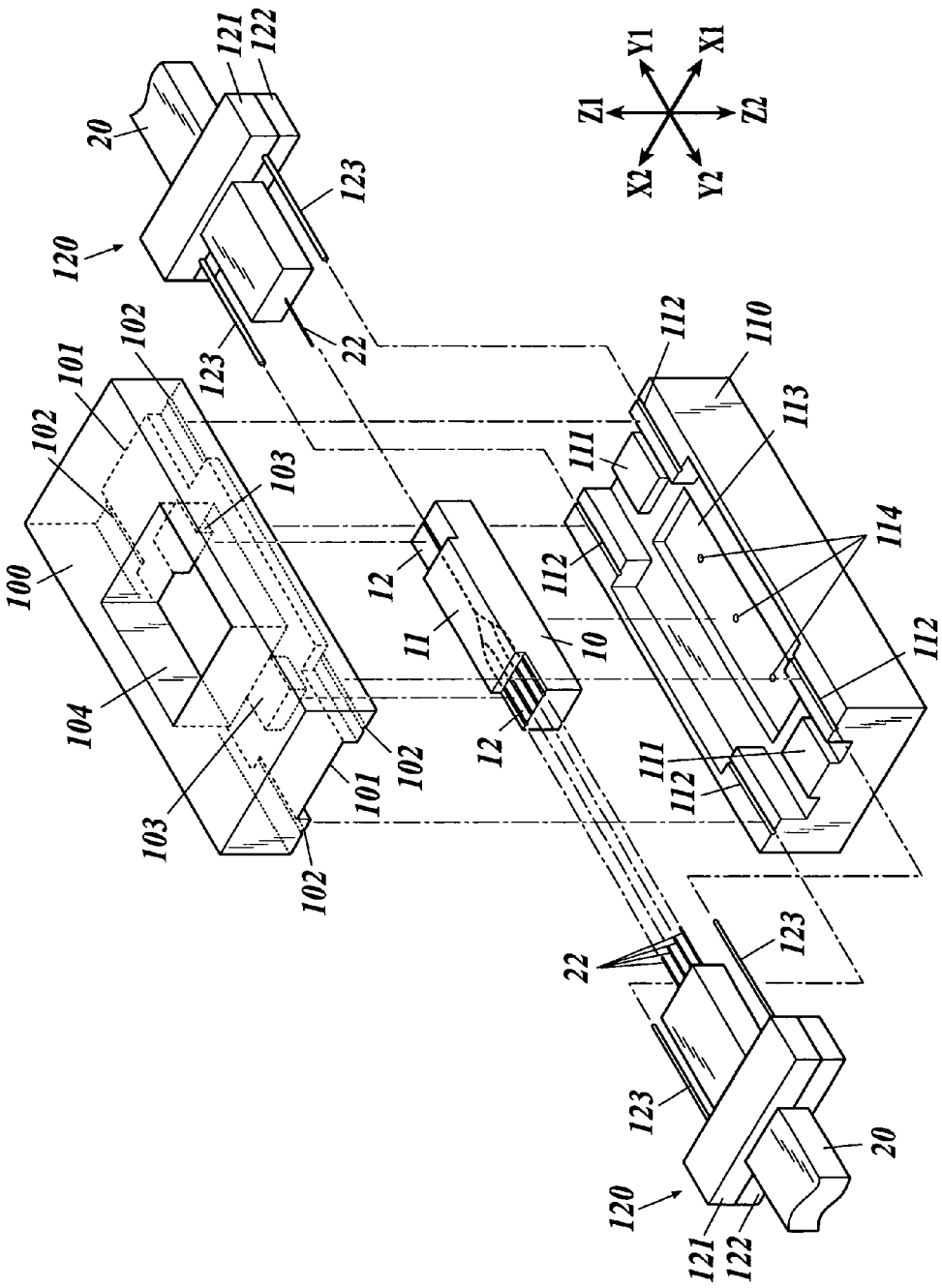
FIG. 3 is an exploded perspective view of a device for producing an optical waveguide device.
Figure 5A:
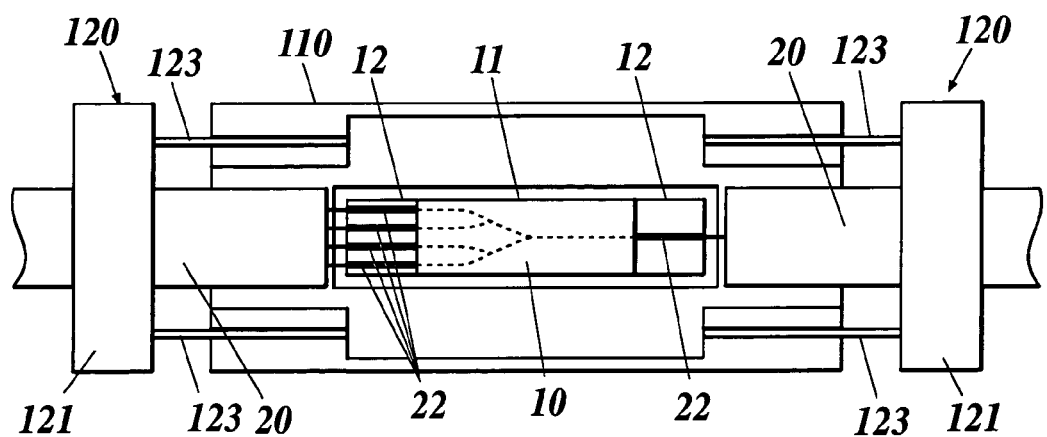
FIG. 5A is an overhead view of the lower jig 110 and the nesting member 120 fitted from a position of the upper jig 100 in a Z2 direction shown in FIG. 3.
Figure 5B:
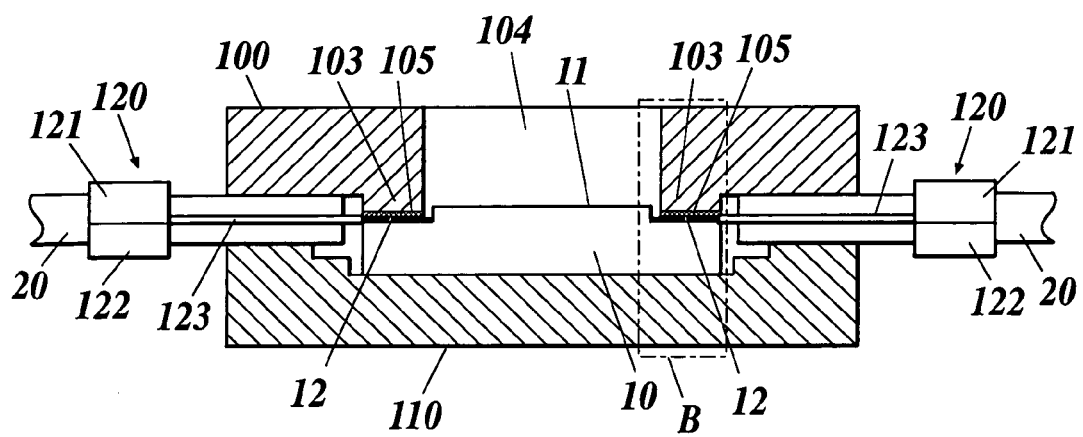
FIG. 5B is an overhead view of the cross-section of the upper jig 100 and the lower jig 110 and the side of the nesting member 120 in a X2 direction when the upper jig 100, the lower jig 110 and the nesting member 120 are fitted.
Figure 6:
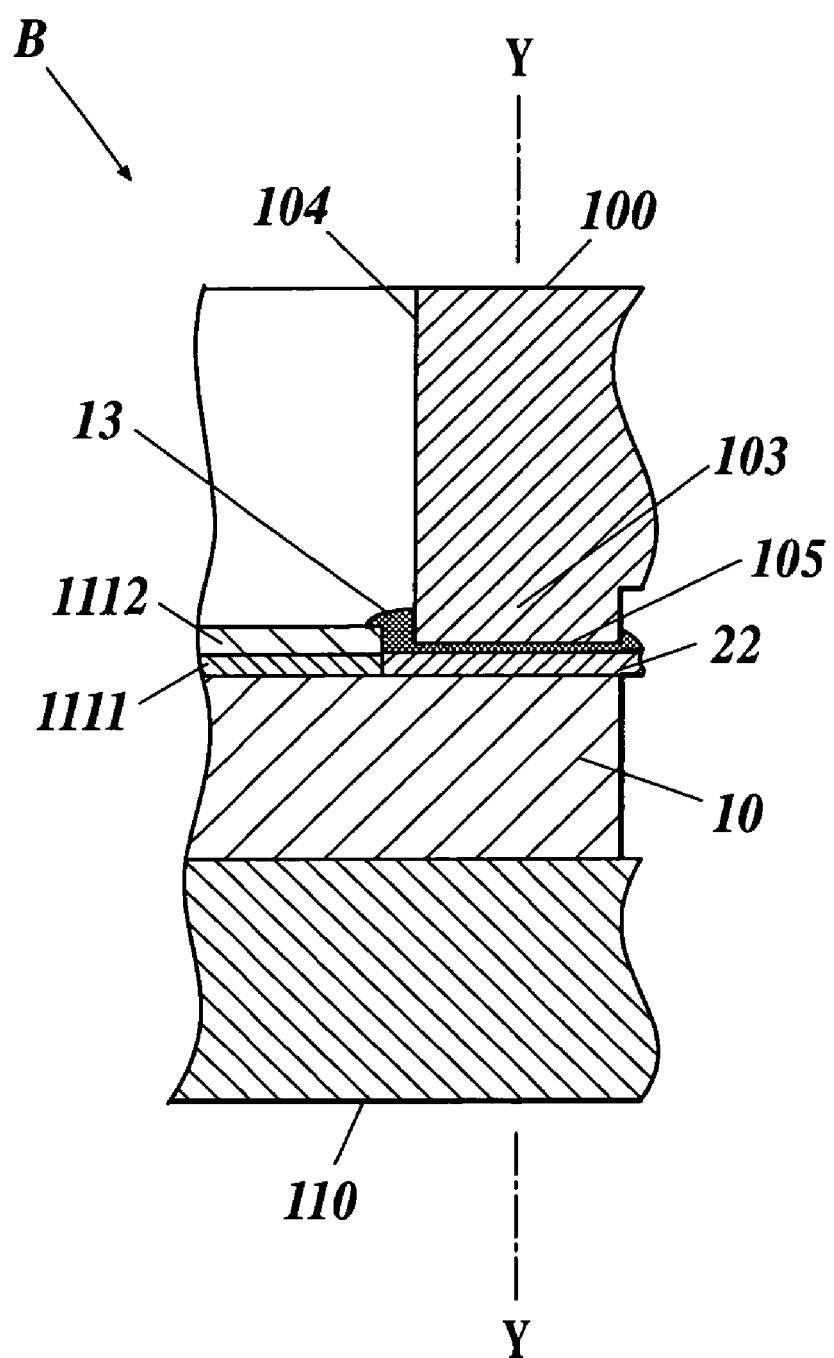
FIG. 6 is an enlarged view of a cross-section of an area B.
Figure 7A:
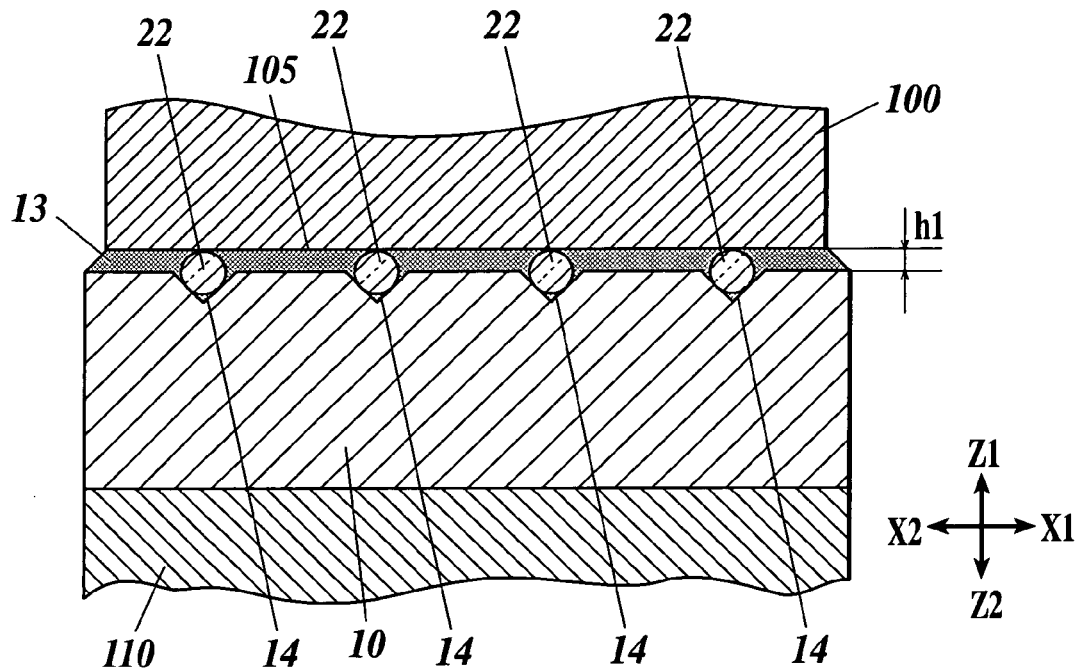
FIG. 7A is an end view showing an end face taken along Y-Y shown in FIG. 6.
Figure 7B:
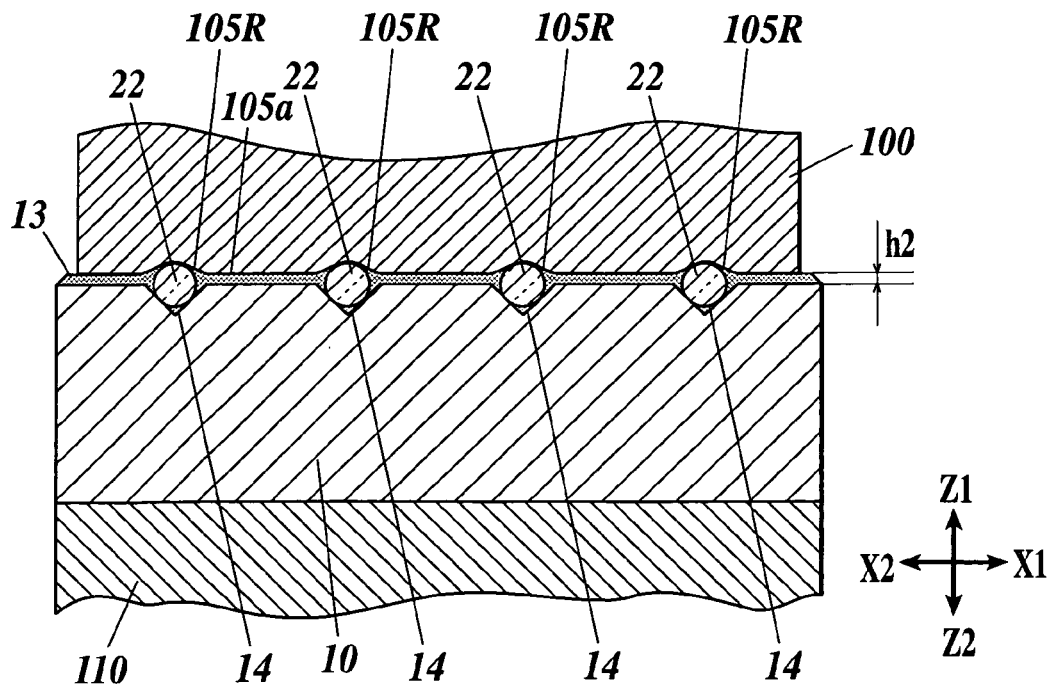
FIG. 7B is an end view showing an end face taken along Y-Y shown in FIG. 6 when a pressing face is deformed.
Figure 8A:
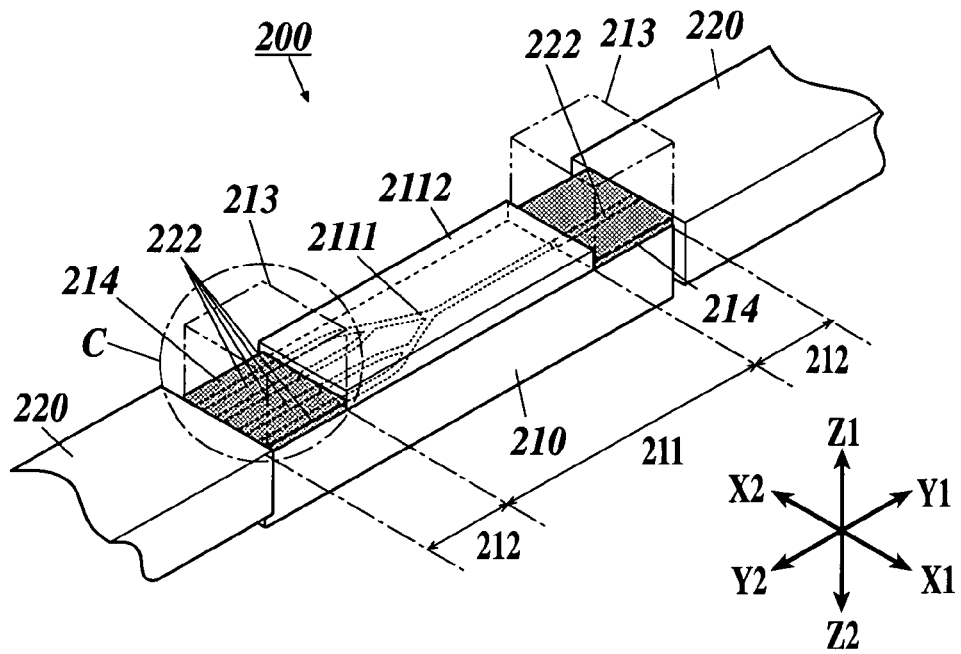
FIG. 8A is a perspective view showing an exterior of an optical waveguide device 200.
Figure 8B:
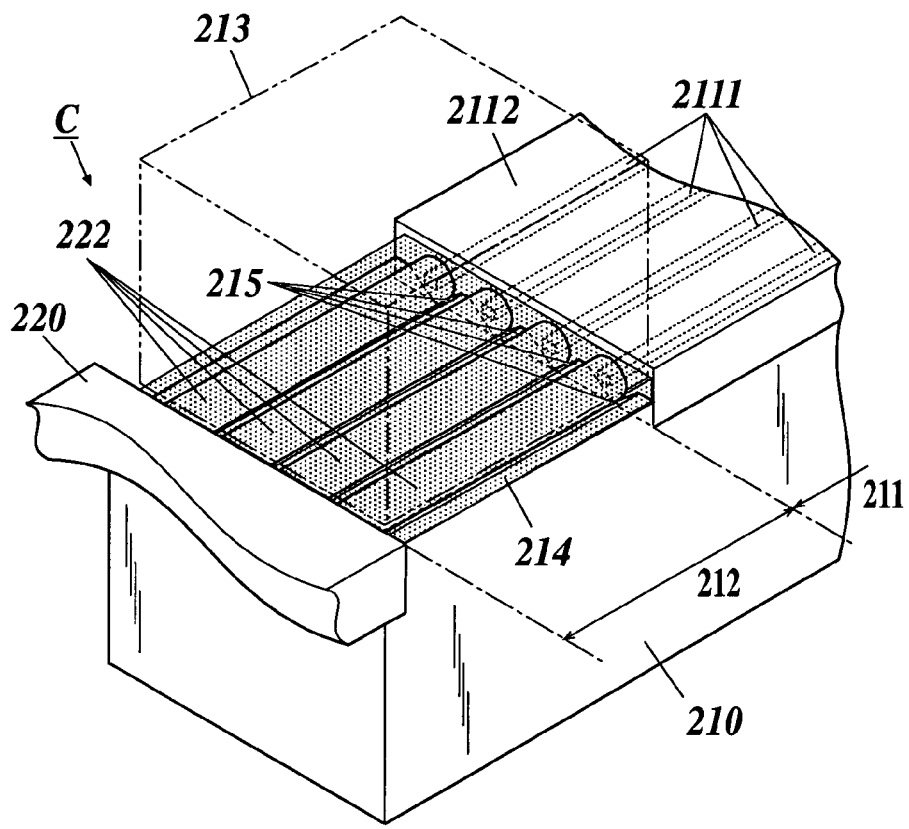
FIG. 8B is a perspective view enlarging an area C.

FIG. 3 is an exploded perspective view of the device for producing the optical waveguide device, FIG. 4A is an overhead view from a position of an upper jig 100 in a Z2 direction shown in FIG. 3, FIG. 4B is an overhead view of a cross-section of the upper jig 100 and a lower jig 110 fitted and a side of a nesting member 120 in a X2 direction shown in FIG. 3, FIG. 5A is an overhead view of the lower jig 110 and the nesting member 120 fitted from a position of the upper jig 100 in a Z2 direction shown in FIG. 3, FIG. 5B is an overhead view of the cross-section of the upper jig 100 and the lower jig 110 and the side of the nesting member 120 in a X2 direction when the upper jig 100, the lower jig 110 and the nesting member 120 are fitted, FIG. 6 is an enlarged view of a cross-section of an area B, FIG. 7A is an end view showing an end face taken along Y-Y shown in FIG. 6, and FIG. 7B is an end view showing an end face taken along Y-Y shown in FIG. 6 when a pressing face is deformed.

As shown in FIG. 3 to FIG. 5B, the device for producing the optical device comprises the upper jig 100 for fixing the substrate 10 from a direction of a face of an optical waveguide section 11 and optical fiber connection section 12 formed on the substrate 10, the lower jig 110 for fixing the substrate 10 from a backside of the above-mentioned direction and a nesting member 120 provided near an end of the optical cable 20, and the optical fiber line 22 is guided to the connection position of the optical fiber connection section 12 by fixing the substrate 10 on the lower jig 110 and inserting the nesting member 120 to fit with the upper jig 100.

As shown in FIG. 3, FIG. 4B and FIG. 5B, on the side where the lower jig 110 is fitted, the upper jig 100 comprises an inserting section 101 which enables the nesting member 120 to insert the optical cable 20 and a guide section 102 for guiding a fitting pin 123 and controlling the position of the nesting member 120, when fitted with the lower jig 110. The upper jig 100 also comprises an optical fiber controlling section 103 for controlling the position where the optical fiber lines 22 are held when the adhesive layer 13 is formed on the optical fiber lines 22 guided to the connection position of the optical fiber connection section 12 to fix the optical fiber lines 22, and an opening 104 for bringing the side where the substrate 10 is fixed and the backside thereof into communication.

As shown in FIG. 4B, FIG. 5B and FIG. 6, the optical fiber control section 103 has a convex shape on the side to which the lower jig 110 is fitted, and on the convex portion, a control face 105 is formed with a shape almost the same as the groove forming face in the optical fiber connection section 12. As shown in FIG. 7A, when the substrate 10 is fitted and fixed with the upper jig 100 and the lower jig 110 with the optical fiber lines 22 fitted in the V-grooves 14, the amount of the convex shape of the optical fiber control section 103 is to the extent that the control face 105 is in contact with the upper face of the optical fiber lines 22 (gap to a degree of the thickness h1). Thus, the optical fiber control section 103 controls the optical fiber lines 22 so that the optical fiber lines 22 are not separated from the V-grooves 14 when the optical fiber lines 22 are fitted into the V-grooves 14.

The control face 105 is coated with fluorine resin so that it may easily separate from the adhesive member fixing the optical fiber lines 22. As shown in FIG. 7A, when the substrate 10 is fixed to the lower jig 110 and fitted with the upper jig 100, and the optical fiber lines 22 are fitted in the V-grooves 14 and fixed with the adhesive member, the control face 105 may form an almost plane adhesive layer 13 with the thickness h1. Alternatively, at this time, as shown in FIG. 7B, a control face 105a with a control curved face 105R in accordance with the outer circumferential face of the optical fiber lines 22 may form the adhesive layer 13 with the above-described surface 13R with the thickness h2. Further, the shape is not limited, and the shape may be the above-described inverted V-shape or a trapezoidal shape.

As shown in FIG. 3, FIG. 4B and FIG. 5B, the opening 104 is almost the same shape as the optical waveguide section 11, and the optical waveguide section 11 is exposed even when fitted with the upper jig 100. Thus, as shown in FIG. 6, curing of the adhesive member by ultraviolet irradiation when the optical fiber lines 22 are inserted and fixed with the jig after the adhesive member is applied to the optical fiber connection section 12, or flowing-in of the adhesive member by the capillary phenomenon between the control face 105 and the groove forming face SF and optical fiber lines 22 after fixing with the jig may be performed.

As shown in FIG. 3 to FIG. 5B, the lower jig 110 comprises an inserting section 111 which enables insertion of the optical cable 20 and a guide section 112 for guiding the fitting pin 123 to control the position of the nesting member 120, when fitted with the upper jig 100. The lower jig 110 also comprises a substrate fixing section 113 for fixing the substrate 10. The substrate fixing section 113 includes a vacuum hole 114 for closely fixing the substrate 10 to the substrate fixing section 113 by vacuum suction.

As shown in FIG. 3 to FIG. 5B, the nesting member 120 is a combination of an upper nesting member 121 and a lower nesting member 122 fixed near the end of the optical cable 20 and alignment is performed with the fitting pin 123 protruding in the direction of the end of the optical cable 20 and the above-described guide section 102 and 112.

As described above, when the substrate 10 is fixed to the lower jig 110, the upper jig 100 including the nesting member 120 and the control face 105 is fitted, and the optical fiber lines 22 are fitted in the V-grooves 14 and the control face 105 is provided in a position where the control face 105 is in contact with the upper face of the optical fiber lines 22. Consequently, by flowing-in an adhesive member when the optical fiber lines 22 are fitted in the V-grooves 14 or applying the adhesive member in advance before the optical fiber lines 22 are fitted in the V-grooves 14, the optical waveguide device 1 with the optical fiber lines 22 embedded in the adhesive layer 13 as described above may be produced.

The description of the present embodiment shows an example of the present invention and thus the present invention is not limited to the embodiment shown. The detailed structure of the optical waveguide device 1 and the detailed structure of the device for producing the optical waveguide device 1 of the present invention may be suitably modified without leaving the scope of the spirit of the invention.

For example, in the present embodiment, an optical splitter is shown as an example of the optical waveguide section 11, however the structure may transmit light to the optical fiber lines 22 comprising a Laser Diode (LD), Vertical-Cavity Surface-Emitting Laser (VCSEL), Photo Diode (PD) or the like. As for the connection layout of the optical fiber lines 22 shown in the present embodiment, instead of single-core to multi-core, the layout may be single-core to single-core or multi-core to multi-core, and is not limited.

INDUSTRIAL APPLICABILITY

The optical waveguide device and the device for producing the optical waveguide device of the present invention may be applied to the field of optical communication.

DESCRIPTION OF REFERENCE NUMERALS 1 optical waveguide device
10 substrate
11 optical waveguide section
1111 core
1112 cladding
12 optical fiber connection section
13 adhesive layer
13R, 13S surface
14 V-groove
20 optical cable
22 optical fiber line
100 upper jig
101 inserting section
102 guide section
103 optical fiber control section
104 opening
105, 105a control face
105R control curved face
110 lower jig
111 inserting section
112 guide section
113 substrate fixing section
114 vacuum hole
120 nesting member
121 upper nesting member
122 lower nesting member
123 fitting pin
A, B, C area
SF groove forming face
h1, h2 thickness
200 optical waveguide device
210 substrate
211 optical waveguide section
2111 core
2112 cladding
212 connection section
213 glass block
214 adhesive member
215 V-groove
220 optical cable
222 optical fiber line

The invention claimed is:

1. An optical waveguide device comprising:
a substrate on which an optical waveguide is formed;
a groove formed in a groove-forming face at an end of the substrate along a light transmitting direction of the optical waveguide, wherein a connection end of an optical fiber is fitted into the groove; and
an adhesive layer provided on the groove-forming face of the substrate for embedding the connection end of the optical fiber such that the adhesive layer substantially covers an outer circumferential face of the optical fiber outside of the groove, wherein the adhesive layer has an upper face that is almost parallel to the groove-forming face of the substrate and is above the groove-forming face, the whole upper face of the adhesive layer is substantially flat, and the adhesive layer has a thickness such that the adhesive layer covers the outer circumferential face of the optical fiber outside of the groove.

2. A device for producing the optical waveguide device according to claim 1, comprising:
a lower jig to fix the substrate which includes the optical waveguide and the groove; and
an upper jig provided with an optical fiber control section, the optical fiber control section including a control face to be in contact with an upper face of the connection end of the optical fiber so that the optical fiber is not separated from the groove when the connection end of the optical fiber is fitted into the groove and the substrate is fixed to the lower jig.

3. The device for producing the optical waveguide device according to claim 2, wherein the control face of the optical fiber control section is coated with fluorine resin.

4. The device according to claim 1, wherein a plurality of the grooves are provided, and the connection ends of a plurality of the optical fibers are fitted into the grooves; and
wherein the adhesive layer extends between the optical fibers on the groove-forming face of the substrate.

5. The device for producing the optical waveguide device according to claim 2, wherein the upper jig is provided with an opening for exposing the optical waveguide when the substrate is fixed by the upper jig.

6. A method for producing an optical waveguide device, the method comprising:
providing a substrate on which an optical waveguide is formed, wherein a groove is formed in a groove-forming face at an end of the substrate along a light transmitting direction of the optical waveguide;
fitting a connection end of an optical fiber into the groove; and
embedding the connection end of the optical fiber by an adhesive layer provided on the groove-forming face of the substrate such that the adhesive layer substantially covers an outer circumferential face of the optical fiber outside of the groove, wherein the adhesive layer has an upper face that is almost parallel to the groove forming face of the substrate and is above the groove-forming face, the whole upper face of the adhesive layer is substantially flat, and the adhesive layer has a thickness such that the adhesive layer covers the outer circumferential face of the optical fiber outside of the groove.

* * * * *